United States Patent [19]

Vandemoere et al.

[11] Patent Number: 4,901,097
[45] Date of Patent: Feb. 13, 1990

[54] DISPOSABLE SINGLE-USE CAMERA WITH LENS SHADE

[75] Inventors: Alan V. Vandemoere, Rochester; William H. Goddard, Hilton; Ralph M. Lyon, Rochester, all of N.Y.

[73] Assignee: Eastman Kodak Company, Rochester, N.Y.

[21] Appl. No.: 334,402

[22] Filed: Apr. 7, 1989

[51] Int. Cl.⁴ .............................................. G03B 11/04
[52] U.S. Cl. .................................... 354/295; 354/288; 350/580
[58] Field of Search ................. 354/75, 287, 288, 295; 350/580, 581

[56] References Cited

U.S. PATENT DOCUMENTS

| | | | |
|---|---|---|---|
| 3,379,485 | 4/1968 | Steisslinger | 354/287 |
| 3,774,992 | 11/1973 | Steiner | 350/580 |
| 4,045,117 | 8/1977 | Lerner | 354/287 |
| 4,381,890 | 5/1983 | Wallace | 354/295 |
| 4,766,451 | 8/1988 | Fujimura et al. | 354/288 |
| 4,801,957 | 1/1989 | Vandemoere | 354/288 |
| 4,804,987 | 2/1989 | Arai | 354/288 |

Primary Examiner—A. A. Mathews
Attorney, Agent, or Firm—Roger A. Fields

[57] ABSTRACT

In a disposable single-use camera comprising an inner camera shell pre-loaded with film and an outer paper pack which substantially encloses the camera shell, a lens shade connected to the shell overlies the paper pack at the perimeter of an opening in the pack for the taking lens. Thus, the paper pack is secured flatly in place between the camera shell and the lens shade to prevent the pack from shifting into the field of view of the taking lens or bowing away from the shell.

5 Claims, 2 Drawing Sheets

DISPOSABLE SINGLE-USE CAMERA WITH LENS SHADE

CROSS-REFERENCE TO A RELATED APPLICATION

Reference is made to commonly assigned copending application Ser. No. 157,239 entitled DISPOSABLE SINGLE USE CAMERA AND ACCESSORY RE-USABLE ELECTRONIC FLASH UNIT and filed Feb. 18, 1988 in the name of Alan V. Vandermoere, now U.S. Pat. No. 4,801,957.

BACKGROUND OF THE INVENTION

1. Field of the Invention

The invention relates generally to the field of photography, and more particularly to a disposable single-use camera.

2. Description of the Prior Art

Recently, a disposable single-use 35 mm camera referred to as the "Quick Snap" was introduced by Fuji Photo Film. Co. Ltd., and another disposable single-use 35 mm camera referred to as the "Fling 35" was introduced by Eastman Kodak Co. Generally, each disposable camera is a point-and-shoot type and comprises (1) a plastic inner camera shell which houses a taking lens, a film metering mechanism, and a shutter and (2) a paper-cardboard outer sealed pack which contains the inner camera shell and has respective openings for the taking lens and for a shutter release button, a frame counter window, a film advance thumbwheel, and a simple see-through viewfinder, located on the inner camera shell. At the manufacturer, the camera shell is loaded with a conventional 24-exposure 35 mm film cartridge, and substantially the entire length of the unexposed filmstrip is factory prewound from the cartridge into a supply chamber of the camera shell. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera shell from the paper-cardboard sealed pack and then removes the filmstrip from the camera shell. The filmstrip is processed, and the camera shell and the opened pack are thrown away.

THE CROSS-REFERENCED APPLICATION

The cross-referenced application discloses a disposable single-use camera generally of the type wherein an inner camera shell is pre-loaded with film and supports an interior taking lens, and an outer sealed pack contains the camera shell and has an opening for the taking lens. According to the invention, the inner camera shell has flash synchronization access ports and the outer sealed pack is constructed of a performable material such as paper which covers the access ports. An accessory re-usable electronic flash unit intended for use with the disposable camera includes electrically conductive flash synchronization pins shaped to perforate the outer sealed pack to enter the access ports, whereby the flash unit is removably connected to the inner camera shell.

SUMMARY OF THE INVENTION

According to the invention there is provided an improved disposable single-use camera wherein (a) a rigid inner camera shell is pre-loaded with film and has a taking lens opening and (b) an outer paper pack contains the rigid camera shell and has a larger opening for substantially revealing the taking lens opening, and wherein the improvement comprises:

a lens shade adapted to overlie said paper pack at the perimeter of said larger opening and to substantially reveal said taking lens opening; and coupling means arranged on said rigid camera shell and said lens shade for connecting the shell and the shade intimately to secure said paper pack in place between the two, to prevent the paper pack from shifting or bowing relative to the shell.

The foregoing design is believed to be an improvement over the prior art because by preventing the outer paper pack from shifting or bowing relative to the inner camera shell the paper pack cannot move into the field of view of the taking lesn or move to interfere with any of the manually operated elements protruding from the camera shell.

BRIEF DESCRIPTION OF THE DRAWINGS

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
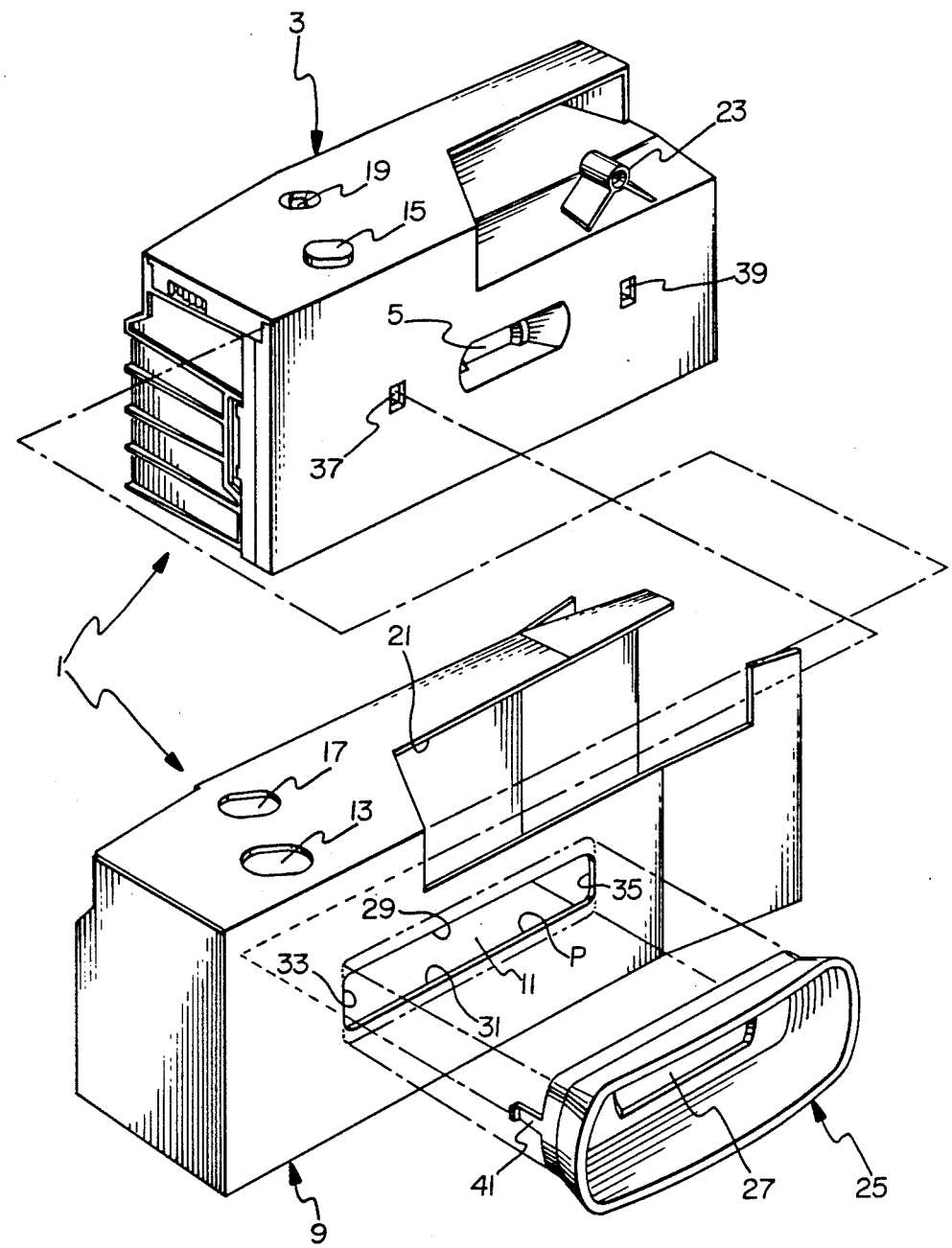
FIG. 1 is an exploded perspective view of a disposable single-use camera with a lens shade, according to a preferred embodiment of the invention.
Figure 2:
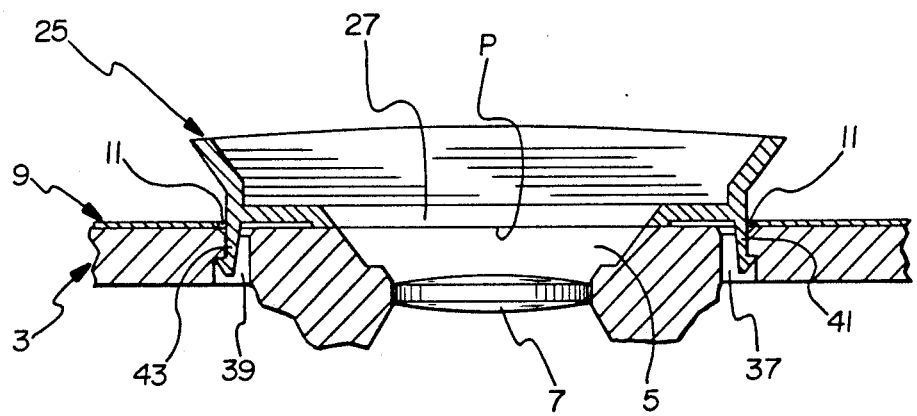
FIG. 2 is a sectional view of the lens shade and a front portion of the disposable camera, depicting the manner in which the two are connected.

Referring now to the drawings, FIGS. 1 and 2 depict a disposable single-use camera 1. The disposable camera 1 is a point-and-shoot type and comprises (i) an inner camera shell 3 which has a front lens opening 5 for an internally supported wide-angle taking lens 7 and houses a film metering mechanism and a single blade shutter (not shown), and (ii) an outer sealed pack 9 which contains the camera shell, has a rectangular-shaped front opening 11 substantially revealing the lens opening, and has a top opening 13 for a manually depressible shutter release button 15 on the top of the shell, a top opening 17 for a frame counter window 19 on the top of the shell, a rear opening for a manually rotatable film advance thumbwheel (not shown) at the rear of the shell, and a cut-away 21 for direct see-through front and rear viewfinder sights integrally formed with the shell. Only the front sight 23 is illustrated. The outer sealed pack 9 is decorative in nature and is constructed of a paper-cardboard material. The inner camera shell 3 is constructed of a rigid plastic black-color substance.

At the manufacturer, the inner camera shell 3 is loaded with a conventional 24-exposure 35 mm film cartridge and substantially the entire length of the unexposed filmstrip is factory prewound from the cartridge onto a take-up spool (not shown) in the camera shell.

After the customer takes a picture by depressing the release button 15, the thumbwheel is manually rotated to rewind the exposed frame into the cartridge. The rewinding movement of the filmstrip the equivalent of one frame rotates a metering sprocket (not shown) to decrement a frame counter (not shown) to its next lower numbered setting. When substantially the entire length of the filmstrip is exposed and rewound into the cartridge, the single-use camera 1 is sent to a photofinisher who first removes the inner camera shell 3 from the outer paper pack 9 and then removes the filmstrip from the camera shell. The filmstrip is processed, and the camera shell 3 and the opened pack 9 are thrown away.

According to the invention, an outwardly flared lens shade 25 is dimensioned to overlie the outer paper pack 9 at the perimeter P of the front opening 11 in the pack, and it has a central opening 27 for substantially revealing the front lens opening 5 of the inner camera shell 3. Specifically, as shown in FIG. 1, the lens shade 25 is dimensioned to overlie the paper pack 9 along two parallel relatively long portions 29 and 31 of the perimeter P and to extend within the front opening 11 substantially adjacent two parallel relatively short portions 33 and 35 of the perimeter P. Coupling means for manually snap-connecting the inner camera shell 3 and the lens shade 25 preferably is in the form of (i) two front securement cavities 37 and 39 arranged in the camera shell 3 at either side of the lens opening 5 to be accessible through the front opening 11 at respective locations substantially adjacent the two short portions 33 and 35 of the perimeter P and (ii) two prong-like extensions 41 and 43 of the lens shade 25 adapted to extend through the front opening into the respective cavities as shown in FIG. 2. The coupling means serves to connect the camera shell 3 and the lens shade 25 intimately to secure the paper pack 9 sandwiched flatly in place between the two, to prevent the pack from shifting into the field of view of the taking lens 7 or bowing away from the shell. Moreover, the coupling means allows the camera shell 3 and the paper pack 9 to be assembled (i.e. the shell within the pack) before connecting the lens shade 25 to the shell.

Further details of the disposable camera 1 are illustrated in commonly assigned, copending application Ser. No. 07/334491, entitled Disposable Single Use Camera With Lens Shade, and filed Apr. 7, 1989 in the names of Bruce A. Leondard and Ralph M. Lyon.

The invention has been described with reference to a preferred embodiment. However, it will be appreciated that variations and modifications can be effected within the ordinary skill in the art without departing from the scope of the invention.

We claim:

1. An improved disposable single-use camera wherein (a) a rigid inner camera shell is pre-loaded with film and has a taking lens opening and (b) an outer paper pack contains said rigid camera shell and has a larger opening for substantially revealing said taking lens opening, and wherein the improvement comprises:
    a lens shade adapted to overlie said paper pack at the perimeter of said larger opening and to substantially reveal said taking lens opening; and
    coupling means arranged on said rigid camera shell and said lens shade for connecting the shell and the shade intimately to secure said paper pack in place between the two, to prevent the paper pack from shifting or bowing relative to the shell.

2. The improvement as recited in claim 1, wherein said coupling means includes respective engagement means arranged on said camera shell and said lens shade for enabling the two to be manually connected even though the shell is contained within said paper pack.

3. The improvement as recited claim 1, wherein said coupling means includes securement cavities arranged in said camera shell at either side of said taking lens opening to be accessible through said larger opening and prong-like extensions of said lens shade adapted to extend within the larger opening into the respective securement cavities.

4. The improvement as recited in claim 1, wherein said lens shade is adapted to overlie said paper pack along a relatively long portion of the perimeter of said larger opening and to extend within the larger opening substantially adjacent a relatively short portion of its perimeter.

5. The improvement as recited in claim 4, wherein said coupling means includes first engagement means arranged on said camera shell to be accessible through said larger opening at a location substantially adjacent said relatively short portion of its perimeter and second engagement means arranged on said lens shade to extend through the larger opening to engage with said first engagement menas.

* * * * *